US010919812B2

(12) United States Patent
Harada et al.

(10) Patent No.: US 10,919,812 B2
(45) Date of Patent: Feb. 16, 2021

(54) CERAMIC POWDER AND BORON NITRIDE SINTERED MATERIAL

(71) Applicant: Sumitomo Electric Industries, Ltd., Osaka (JP)

(72) Inventors: Takashi Harada, Itami (JP); Satoru Kukino, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/297,169

(22) Filed: Mar. 8, 2019

(65) Prior Publication Data

US 2019/0202745 A1 Jul. 4, 2019

Related U.S. Application Data

(62) Division of application No. 15/556,276, filed as application No. PCT/JP2016/056783 on Mar. 4, 2016, now abandoned.

(30) Foreign Application Priority Data

Mar. 9, 2015 (JP) .................................. 2015-045819
Sep. 17, 2015 (WO) .................. PCT/JP2015/076436

(51) Int. Cl.
| | | |
|---|---|---|
| C04B 35/58 | (2006.01) | |
| C04B 35/5831 | (2006.01) | |
| C04B 35/626 | (2006.01) | |
| C01B 21/06 | (2006.01) | |
| C01B 21/076 | (2006.01) | |
| C01G 23/00 | (2006.01) | |
| C04B 35/583 | (2006.01) | |
| C01B 32/90 | (2017.01) | |

(52) U.S. Cl.
CPC .......... *C04B 35/5831* (2013.01); *C01B 21/06* (2013.01); *C01B 21/062* (2013.01); *C01B 21/0617* (2013.01); *C01B 21/076* (2013.01); *C01B 32/90* (2017.08); *C01G 23/00* (2013.01); *C04B 35/583* (2013.01); *C04B 35/58014* (2013.01); *C04B 2235/386* (2013.01); *C04B 2235/3886* (2013.01)

(58) Field of Classification Search
CPC .............. C01B 21/076; C01B 21/0761; C01B 21/0763; C01B 21/0765; C01B 21/0768; C01B 21/0828; C04B 35/58007; C04B 35/58014; C04B 35/25021; C04B 35/58028; C04B 35/58035; C04B 35/58042; C04B 35/5831; C04B 35/58021

See application file for complete search history.

(56) References Cited

U.S. PATENT DOCUMENTS

| | | | | |
|---|---|---|---|---|
| 5,597,543 A | ‡ | 1/1997 | Zeiringer | C01B 21/0602 423/380 |
| 5,639,285 A | * | 6/1997 | Yao | C04B 35/5831 51/307 |
| 7,413,359 B2 | | 8/2008 | Tokunaga | |
| 7,413,591 B2 | ‡ | 8/2008 | Tokunaga | B22F 5/003 407/119 |
| 2004/0137219 A1 | ‡ | 7/2004 | Tokunaga | B22F 5/003 428/328 |

FOREIGN PATENT DOCUMENTS

| | | |
|---|---|---|
| CN | 1509832 A | 7/2004 |
| EP | 0693456 A1 | 1/1996 |
| EP | 0693456 A1 ‡ | 1/1996 |
| JP | S56-045844 B2 | 10/1981 |
| JP | S56-045844 B2 ‡ | 10/1981 |
| JP | S58-213606 A | 12/1983 |
| JP | S58-213606 A ‡ | 12/1983 |
| JP | S58-213617 A | 12/1983 |
| JP | S58-213617 A ‡ | 12/1983 |
| JP | S61-127607 A | 6/1986 |
| JP | S61-127607 A ‡ | 6/1986 |
| JP | S62-059507 A ‡ | 3/1987 |
| JP | S62-059507 A | 3/1987 |
| JP | H01-264913 A ‡ | 10/1989 |
| JP | H01-264913 A | 10/1989 |
| JP | H09-100163 A | 4/1997 |
| JP | H09-100163 A ‡ | 4/1997 |
| JP | 3199395 B1 | 8/2001 |
| JP | 3199395 B2 ‡ | 8/2001 |
| JP | 2014-084243 A | 5/2014 |
| JP | 2014-084243 A ‡ | 5/2014 |

OTHER PUBLICATIONS

Yi et al., "Study of metal organic chemical vapor deposition TiN thin films in real structures," Thin Solid Films, Dec. 5, 2006, vol. 515, No. 4, p. 2803-2806.‡
Klimczyk, P., et al., "Cubic boron nitride—Ti/TiN composites: hardness and phase equilibrium as function of temperature," Journal of Alloys and Compounds, 382 (2004), 195-205.
Yi et al., "Study of metal organic chemical vapor deposition TiN thin films in real structures," Thin Solid Films, Dec. 5, 2006, vol. 515, No. 4, p. 2803-2806 [Cited in Parent].
Notification of the Second Office Action issued in counterpart Chinese Patent Application No. 201680014333.7 dated Feb. 3, 2020.
Fang et al., "The Basics and Standards of Synthetic Diamond and Cubic Boron Nitride," Chemical Industry Press, pp. 150-153 [Cited in OA].

* cited by examiner
‡ imported from a related application

Primary Examiner — Karl E Group
(74) Attorney, Agent, or Firm — Baker Botts L.L.P.; Michael A. Sartori

(57) ABSTRACT

A ceramic powder containing at least one of a nitride and a carbonitride of a metal element as a major component, the metal element being one or more elements selected from the group consisting of a group 4 element, a group 5 element and a group 6 element, the ceramic powder having particles having an average particle size of 5 μm or less, and an oxygen content of 0.3% by mass or less.

6 Claims, No Drawings

CERAMIC POWDER AND BORON NITRIDE SINTERED MATERIAL

CROSS REFERENCE TO PRIOR APPLICATIONS

This application is a divisional of U.S. patent application Ser. No. 15/556,276, filed Sep. 6, 2017, now abandoned, which is a U.S. National Phase application under 35 U.S.C. § 371 of International Application No. PCT/JP2016/056783, filed on Mar. 4, 2016, which claims priority from Japanese Patent Application No. 2015-045819 dated Mar. 9, 2015.

TECHNICAL FIELD

The present invention relates to a ceramic powder containing at least one of a nitride and a carbonitride of a metal element as a major component, and a boron nitride sintered material using the ceramic powder.

BACKGROUND ART

Powders of a nitride and a carbonitride of a metal element of a group 4 element, a group 5 element or a group 6 element are used as materials for conductive materials, raw materials for hard materials for cutting tools and anti-abrasive parts, etc. The nitride is exemplified by titanium nitride, and the carbonitride is exemplified by titanium carbonitride.

Titanium nitride powder is produced generally by: heating a high-purity metallic titanium powder in a nitrogen-containing atmosphere to produce titanium nitride powder through a nitriding reaction; mixing a source of carbon into titanium oxide as a reducing agent and heating the mixture in a nitrogen-containing atmosphere to produce titanium nitride powder by reduction and nitriding, as described in Japanese Patent Laying-Open No. 58-213606 (Patent Document 1); or the like.

CITATION LIST

Patent Document

PTD 1: Japanese Patent Laying-Open No. 58-213606

SUMMARY OF INVENTION

Technical Problem

In the above method for producing titanium nitride powder by a nitriding reaction using high-purity metallic titanium powder, however, titanium nitride particles melt due to significant heat generation during the nitriding reaction and thus form coarse lumps, and the produced powder cannot be used in an application as desired.

Furthermore, although Patent Document 1 describes titanium nitride powder having an oxygen content of 0.5% or less while preventing titanium nitride particles from being coarsened, there is a case in which when this is used as a raw material for a hard material the hard material is insufficient in strength.

The present invention has been made in view of the above current circumstances, and contemplates a novel ceramic powder which contains as a major component at least one of a nitride and a carbonitride including a metal element of a group 4 element, a group 5 element or a group 6 element and can provide a hard material with sufficient strength when it is used as a raw material for the hard material, and a boron nitride sintered material using the ceramic powder.

Solution to Problem

A ceramic powder according to one aspect of the present invention contains at least one of a nitride and a carbonitride of a metal element as a major component, the metal element being one or more elements selected from the group consisting of a group 4 element, a group 5 element and a group 6 element, and the ceramic powder has an average particle size of 5 μm or less and an oxygen content of 0.3% by mass or less.

Advantageous Effects of Invention

The present invention can provide a ceramic powder capable of providing a sintered material of an inorganic compound with sufficient strength. Furthermore, the present invention can provide a boron nitride sintered material of high strength using such ceramic powder.

DESCRIPTION OF EMBODIMENTS

Hereinafter, an embodiment of the present invention (hereinafter simply referred to as "the present embodiment") will be described more specifically.

[Ceramic Powder]

A ceramic powder of an embodiment of the present invention (hereinafter also referred to as "the present embodiment") contains at least one of a nitride and a carbonitride of a metal element as a major component, the metal element being one or more elements selected from the group consisting of a group 4 element, a group 5 element and a group 6 element. The nitride and carbonitride of the present embodiment are not limited to a case where they are composed of a single type of metal element, and may be a solid solution containing two or more types of metal elements. When two or more types of metal elements are contained, at least one type of metal element may be an element selected from the group consisting of a group 4 element, a group 5 element and a group 6 element. Furthermore, the carbonitride of a metal element is not limited such that it has a composition ratio of carbon and nitrogen of 1:1 as long as it contains carbon and nitrogen as constituent elements. For example, the composition ratio of carbon and nitrogen may be 1:0.01 to 0.01:1. The ceramic powder has an average particle size of 5 μm or less and an oxygen content of 0.3% by mass or less. When the ceramic powder having an average particle size of 5 μm or less and an oxygen content of 0.3% by mass or less is used as a raw material for a hard material, a sintered material of high strength can be produced.

In the present specification, the average particle size of the ceramic powder means a volume average particle size measured in a laser diffraction/scattering method. Furthermore, in the present specification, the oxygen content of the ceramic powder is a value measured with an oxygen analyzer (for example, EMGA-650 W manufactured by HORIBA).

In the ceramic powder of the present embodiment, the oxygen content is preferably 0.1% by mass or less. When the ceramic powder having an oxygen content of 0.1% by mass or less is used as a raw material for a hard material, a sintered material of higher strength can be produced.

The ceramic powder of the present embodiment has a carbon content preferably of 0.5% by mass or less, more preferably 0.3% by mass or less. When carbon is mixed into a nitride, it reduces strength, and by the amount of carbon to 0.3% by mass or less, still higher strength can be expected. As the carbon content is suppressed to be low, the ceramic powder of the present embodiment is more preferably what contains a nitride as a major component and does not contain a carbonitride. Furthermore, in the present specification, the carbon content of the ceramic powder is a value measured with a carbon analyzer (for example, CS-200 manufactured by LECO JAPAN CORPORATION).

A metal element constituting the nitride or carbonitride serving as a major component of the ceramic powder is exemplified by group 4 elements such as titanium (Ti), zirconium (Zr) and hafnium (Hf), group 5 elements such as vanadium (V), niobium (Nb) and tantalum (Ta), and group 6 elements such as chromium (Cr), molybdenum (Mo) and tungsten (W). The nitride containing these as a constituent element is exemplified by TiN, ZrN, HfN, VN, NbN, TaN, CrN, MoN, WN, and the carbonitride containing these as a constituent element is exemplified by TiCN, ZrCN, HfCN, VCN, NbCN, TaCN, CrCN, MoCN, WCN. Among the above nitrides or carbonitrides, titanium nitride (TiN) is preferable as it has high utility in that it has an excellent property as a raw material for a hard material and its materials are also easily obtained. While in the above description, nitrides and carbonitrides containing only one type of metal element as a constituent are indicated as examples, the nitride and carbonitride may be a solid solution containing two or more types of metal elements, as has been discussed above.

The ceramic powder has particles having a particle size of 1 μm or less in a proportion less than 10% by mass. With particles having a particle size of 1 μm or less in a proportion within this range, when the ceramic powder is used as a raw material for a hard material, thermal conductivity can be improved, and when it is used as a cutting tool, high performance can be expected. The proportion of particles having a particle size of 1 μm or less can be calculated from a particle size distribution obtained in a laser diffraction/scattering method.

The ceramic powder of the present embodiment can be used as a raw material for a hard material for cutting tools, anti-abrasive parts and the like.

[Method for Producing Ceramic Powder]

A method for producing ceramic powder will be described hereinafter as an example. As a first production method, a method will be described in which a raw material of ceramic powder is heated in a gas having an oxygen content reduced by a gas purification device to obtain a desired oxygen content (hereinafter also referred to as a "heating method in a purified gas"), as a second production method, a method will be described in which a raw material of ceramic powder is heated and reduced under low oxygen partial pressure by an oxygen partial pressure control device to obtain a desired oxygen content (hereinafter also referred to as a "heating method under low oxygen partial pressure"), and as a third production method, a method will be described in which a raw material of ceramic powder is reduced by a thermal plasma treatment to obtain a desired oxygen content (hereinafter also referred to as a "thermal plasma method").

[First Production Method]

In this production method, a raw material of ceramic powder with an average particle size of 5 μm or less is prepared as a raw material. The raw material of ceramic powder contains as a major component at least one of a nitride and a carbonitride which include a metal element of a group 4 element, a group 5 element or a group 6 element. Such a raw material of ceramic powder can for example be a commercially available nitride powder, a commercially available carbonitride powder, or a mixture thereof. The commercially available nitride powder normally has an oxygen content exceeding 0.3% by mass and a carbon content of 0.5 to 2% by mass. The commercially available carbonitride powder normally has an oxygen content exceeding 0.3% by mass.

The raw material of ceramic powder thus prepared is heated in an atmosphere in which an $N_2$ gas purified by a gas purification device flows, and reduced to produce a ceramic powder of the present embodiment. The heating temperature is preferably 1500 to 2000° C., and more preferably 1800 to 2000° C. By heating to 1800° C. or more, the reduction treatment can be performed efficiently. Avoiding heating to a temperature exceeding 2000° C. can prevent particles in the raw material of ceramic powder from melting and becoming coarse, and can prevent the heated ceramic powder from having an average particle size significantly varying as compared with that before the ceramic powder is heated. The heating time is not particularly limited as long as it continues until the ceramic powder's oxygen content reaches 0.3% by mass or less, and may for example be 1 to 12 hours. The flow rate of the $N_2$ gas during the heat treatment may be appropriately adjusted depending on the amount of the ceramic powder to be reduced, and may for example be 1 to 5 l/min.

Thus a ceramic powder of the present embodiment, that is, a ceramic powder can be produced which contains as a major component at least one of a nitride and a carbonitride of one of more types of metal elements selected from the group consisting of a group 4 element, a group 5 element and a group 6 element and has particles having an average particle size of 5 μm or less, and an oxygen content of 0.3% by mass or less.

[Second Production Method]

In this production method, a raw material of ceramic powder with an average particle size of 5 μm or less is prepared as a raw material. The raw material of ceramic powder contains as a major component at least one of a nitride and a carbonitride which include a metal element of a group 4 element, a group 5 element or a group 6 element. Such a raw material of ceramic powder can for example be a commercially available nitride powder, a commercially available carbonitride powder, or a mixture thereof. The commercially available nitride powder normally has an oxygen content exceeding 0.3% by mass and a carbon content of 0.5 to 2% by mass. The commercially available carbonitride powder normally has an oxygen content exceeding 0.3% by mass.

The raw material of ceramic powder thus prepared is heated in a nitrogen atmosphere which is of low oxygen partial pressure, and reduced to produce a ceramic powder of the present embodiment. The heating temperature is preferably 1500 to 2000° C., and more preferably 1800 to 2000° C. By heating to 1800° C. or more, the reduction treatment can be performed efficiently. Avoiding heating to a temperature exceeding 2000° C. can prevent particles in the raw material of ceramic powder from melting and becoming coarse, and can prevent the heated ceramic powder from having an average particle size significantly varying as compared with that before the ceramic powder is heated. The heating time is not particularly limited as long as it continues until the ceramic powder's oxygen content reaches 0.3% by mass or less, and may for example be 1 to 12 hours. The oxygen partial pressure applied in the reduction treatment is preferably a low oxygen partial pressure of $1 \times 10^{-29}$ atm or less. By heating under such a low oxygen partial pressure, a reduction treatment allowing an oxygen content of 0.3% by mass or less can be performed efficiently.

Thus a ceramic powder of the present embodiment, that is, a ceramic powder can be produced which contains as a major component at least one of a nitride and a carbonitride of one or more types of metal elements selected from the group consisting of a group 4 element, a group 5 element and a group 6 element and has particles having an average particle size of 5 μm or less, and an oxygen content of 0.3% by mass or less.

[Third Production Method]

In this production method, a raw material of ceramic powder with an average particle size of 5 μm or less is prepared as a raw material. The raw material of ceramic powder contains as a major component at least one of a nitride and a carbonitride which include a metal element of a group 4 element, a group 5 element or a group 6 element. Such a raw material of ceramic powder can for example be a commercially available nitride powder, a commercially available carbonitride powder, or a mixture thereof. The commercially available nitride powder normally has an oxygen content exceeding 0.3% by mass and a carbon content of 0.5 to 2% by mass. The commercially available carbonitride powder normally has an oxygen content exceeding 0.3% by mass.

The raw material of ceramic powder thus prepared is subjected to a thermal plasma treatment and reduced to produce a ceramic powder of the present embodiment. The thermal plasma treatment may be done under an appropriately adjusted condition, and for example, in a chamber adjusted to have a vacuum of 20 to 50 kPa, Ar gas and $H_2$ gas are used as a plasma gas, and a high frequency current of 25 to 35 kW is applied to generate a thermal plasma to subject the ceramic powder to a thermal plasma treatment and thus reduce the ceramic powder. The thermal plasma treatment can be performed without significantly changing the particle size of the particles of the ceramic powder.

Thus a ceramic powder of the present embodiment, that is, a ceramic powder can be produced which contains as a major component at least one of a nitride and a carbonitride of one or more types of metal elements selected from the group consisting of a group 4 element, a group 5 element and a group 6 element and has particles having an average particle size of 5 μm or less, and an oxygen content of 0.3% by mass or less.

[Boron Nitride Sintered Material]

A boron nitride sintered material of the present embodiment is formed by sintering a composite powder including a cubic boron nitride powder and the above-described ceramic powder. The above-described ceramic powder is used as a binder. It is preferable that the ceramic powder be a titanium nitride powder, a titanium carbonitride powder or a powder including titanium nitride and titanium carbonitride. The boron nitride sintered material of the present embodiment is suitably applied to cutting tools etc. The cubic boron nitride powder used in the present embodiment is preferably a powder obtained in a known method, and its average particle size is for example 1 to 5 μm. The temperature at which the composite powder is sintered can for example be 1200° C. or higher. The period of time for which the composite powder is sintered can for example be 5 to 30 minutes. The pressure applied in sintering the composite powder can for example be 5 to 10 GPa.

The boron nitride sintered material of the present embodiment preferably contains 40 to 70% by volume of cubic boron nitride, and more preferably 50 to 65% by volume of cubic boron nitride. When the content of cubic boron nitride is less than 40% by volume, the sintered material's hardness is decreased. Furthermore, when the content of cubic boron nitride exceeds 70% by volume, cubic boron nitrides may contact each other and a defect such as a crack may be caused at the contact portion, and the binder's content may also be relatively reduced resulting in reduced bonding strength.

The boron nitride sintered material of the present embodiment preferably contains ceramic derived from the ceramic powder used as the binder in an amount of 30 to 60% by volume, more preferably 35 to 50% by volume. When the content of the ceramic is less than 30% by volume, the cubic boron nitride powder and the ceramic powder are insufficiently bound together, whereas when it exceeds 60% by volume, sufficient hardness may not be obtained. When the ceramic powder used as the binder has particles having an average particle size of 5 μm or less, and an oxygen content of 0.3% by mass or less, a high-strength boron nitride sintered material can be obtained.

The composite powder may contain a binder other than the above described ceramic powder, and the other binder is exemplified by aluminum (Al) powder and the like.

EXAMPLES

Hereinafter, the present invention will specifically be described with reference to examples, however, the present invention is not limited thereto.

Example 1

Titanium nitride powder was produced in the first production method (the heating method in a purified gas). Specifically, a commercially available titanium nitride powder was prepared as a raw material. The titanium nitride powder was placed in an atmosphere furnace equipped with a tungsten heater, and while $N_2$ gas purified through a gas purification device (the name of the device: Puremate 1100, manufactured by Taiyo Nippon Sanso Corporation) was flowed at 3 l/min, a temperature adjustment was done within a range of 1500 to 2000° C., and a heat treatment was thus performed for 12 hours to obtain titanium nitride powders of Example 1 (Samples 1-1 to 1-6). Samples 1-1 to 1-6 were produced with the heat treatment performed at temperatures as indicated in Table 1.

Example 2

Titanium nitride powder was produced in the second production method (the heating method under low oxygen partial pressure). Specifically, a commercially available titanium nitride powder similar to a raw material used in Example 1 was prepared as a raw material. The titanium nitride powder was placed in an atmosphere furnace having a tungsten heater, with an oxygen partial pressure control device (the name of the device: SiOC-200C, manufactured by STLab CO., LTD.) connected to the device, and in a nitrogen atmosphere with an oxygen partial pressure of $1 \times 10^{-29}$ atm or less, a temperature adjustment was done within a range of 1500 to 2000° C., and a heat treatment was thus performed for 12 hours to obtain titanium nitride powders of Example 2 (Samples 2-1 to 2-6). Samples 2-1 to 2-6 were produced with the heat treatment performed at temperatures as indicated in Table 1.

Example 3

Titanium nitride powder was produced in the third production method (the thermal plasma method). Specifically, a commercially available titanium nitride powder similar to a raw material used in Example 1 was prepared as a raw material. The chamber of a thermal plasma generator (the name of the device: TP series, manufactured by JEOL Ltd.) was adjusted to have a vacuum of 30 kPa therein, and while Ar gas and $H_2$ gas are flowed as a plasma gas at 40 l/min and 10 l/min, respectively, high frequency power of 4 MHz in a range of 25 to 35 kW was applied to an RF coil to generate a thermal plasma, and a carrier gas of Ar gas was supplied thereto at 5 l/min and titanium nitride powder as a raw material was also supplied thereto at 1 g/min, and a thermal plasma treatment was thus performed to obtain titanium nitride powders of Example 3 (samples 3-1 to 3-3). Samples 3-1 to 3-3 were produced with the high-frequency power applied as indicated in Table 1.

Example 4

As raw material powders, commercially available powders composed of a nitride material or a carbonitride material shown in Table 2 were prepared. The powders were all pulverized using a ball mill and thus adjusted in particle size, and thus used as raw material powders. The raw material powders were used in production methods indicated in Table 2 (i.e., any of the first to third production methods) to produce nitride powders (Samples 4-1 to 4-8) and carbonitride powders (Samples 4-9 to 4-11) of Example 4. They were produced specifically in methods similar to those described above in Examples 1-3 in which the same production methods are adopted.

Example 5

0.3% by mass of carbon black was added to a high-purity titanium powder and mixed, and the resultant mixture was placed in an atmosphere furnace equipped with a tungsten heater, and heated in a nitrogen atmosphere at 1,800° C. to obtain titanium nitride. The obtained titanium nitride was pulverized using a ball mill and thus adjusted in particle size, and used as a raw material powder in a production method indicated in Table 2 (i.e., the second or third production method) to produce nitride powders (Samples 5-1 to 5-9) of Example 5. They were produced specifically in methods similar to those described above in Examples 2 and 3 in which the same production methods are adopted.

Example 6

Except that 0.1% by mass of carbon black was added to the high purity titanium powder, production methods indicated in table 2 were employed to produce nitride powders of Example 6 (Samples 6-1 to 6-9) in a manner similar to that of Example 5.

Example 7

This example differs from Example 1 only in that a raw material of titanium nitride powder had fine particles cut using a pneumatic classifier to reduce the proportion of particles of 1 μm or less to less than 10% by mass of the entirety, and was subsequently subjected to a heat treatment. Thus, titanium nitride powders of Example 7 (Samples 7-1 to 7-6) were obtained. Samples 7-1 to 7-6 were produced with the heat treatment performed at temperatures as indicated in Table 3.

Example 8

This example differs from Example 2 only in that a raw material of titanium nitride powder had fine particles cut using a pneumatic classifier to reduce the proportion of particles of 1 μm or less to less than 10% by mass of the entirety, and was subsequently subjected to a heat treatment. Thus, titanium nitride powders of Example 8 (Samples 8-1 to 8-6) were obtained. Samples 8-1 to 8-6 were produced with the heat treatment performed at temperatures as indicated in Table 3.

Example 9

This example differs from Example 3 only in that a raw material of titanium nitride powder had fine particles cut using a pneumatic classifier to reduce the proportion of particles of 1 μm or less to less than 10% by mass of the entirety, and was subsequently subjected to a thermal plasma treatment. Thus, titanium nitride powders of Example 9 (Samples 9-1 to 9-3) were obtained. Samples 9-1 to 9-3 were produced with high-frequency power applied as indicated in Table 3.

Comparative Example 1

A commercially available titanium nitride powder similar to a raw material used in Example 1 was prepared as a raw material. 97% by mass of such titanium nitride powder and 3% by mass of carbon black added thereto were charged into a ball mill, and underwent wet mixing by addition of acetone for 24 hours. The mixture was then dried and thereafter pressure-molded, and while $N_2$ was flown, temperature was increased and the molded mixture was thus heated, and then, as indicated in Table 3, the molded mixture was held at 1900° C. for 2 hours, and thereafter pulverized to provide a titanium nitride powder (comparative sample 1). The production method in Comparative Example 1 is also referred to as a carbon reduction method.

[Measurement]

The nitride powder of each Example and that of Comparative Example 1 had their average particle sizes measured before and after the reduction treatment with a laser diffraction type particle size distribution measurement device. Furthermore, the nitride and carbonitride powders had their oxygen contents measured before and after the reduction treatment with an oxygen analyzer (EMGA-650W manufactured by HORIBA), and their carbon contents measured before and after the reduction treatment with a carbon analyzer (CS-200 manufactured by LECO JAPAN CORPORATION). Furthermore, the titanium nitride powders of Examples 1 to 3 and 5 to 9 had their proportions of particles less than 1 μm after the reduction treatment calculated from particle size distributions obtained via a laser diffraction type particle size distribution measurement device. The measurement result is shown in table 1 to table 3.

TABLE 1

| sample No. | raw material compound | production method | heat treatment temperature (° C.) | high frequency power (kW) |
|---|---|---|---|---|
| sample 1-1 | TiN | heating method in purified gas | 1500 | |
| sample 1-2 | TiN | heating method in purified gas | 1600 | |

TABLE 1-continued

| sample No. | raw material compound | production method | heat treatment temperature (° C.) | high frequency power (kW) |
|---|---|---|---|---|
| sample 1-3 | TiN | heating method in purified gas | 1700 | |
| sample 1-4 | TiN | heating method in purified gas | 1800 | |
| sample 1-5 | TiN | heating method in purified gas | 1900 | |
| sample 1-6 | TiN | heating method in purified gas | 2000 | |
| sample 2-1 | TiN | heating method under low oxygen partial pressure | 1500 | |
| sample 2-2 | TiN | heating method under low oxygen partial pressure | 1600 | |
| sample 2-3 | TiN | heating method under low oxygen partial pressure | 1700 | |
| sample 2-4 | TiN | heating method under low oxygen partial pressure | 1800 | |
| sample 2-5 | TiN | heating method under low oxygen partial pressure | 1900 | |
| sample 2-6 | TiN | heating method under low oxygen partial pressure | 2000 | |
| sample 3-1 | TiN | thermal plasma method | | 25 |
| sample 3-2 | TiN | thermal plasma method | | 30 |
| sample 3-3 | TiN | thermal plasma method | | 35 |

| | pre-treatment | | | post-treatment | | | |
|---|---|---|---|---|---|---|---|
| sample No. | average particle size (μm) | amount of oxygen (wt %) | amount of carbon (wt %) | average particle size (μm) | amount of oxygen (wt %) | amount of carbon (wt %) | proportion of particles less than 1 μm (mass %) |
| sample 1-1 | 2.5 | 1.0 | 0.5 | 2.5 | 0.30 | 0.5 | 18 |
| sample 1-2 | | | | 2.5 | 0.22 | | 18 |
| sample 1-3 | | | | 2.5 | 0.15 | | 18 |
| sample 1-4 | | | | 2.5 | 0.09 | | 18 |
| sample 1-5 | | | | 2.6 | 0.07 | | 16 |
| sample 1-6 | | | | 2.6 | 0.05 | | 14 |
| sample 2-1 | 2.5 | 1.0 | 0.5 | 2.5 | 0.29 | 0.5 | 18 |
| sample 2-2 | | | | 2.5 | 0.22 | | 18 |
| sample 2-3 | | | | 2.5 | 0.15 | | 18 |
| sample 2-4 | | | | 2.5 | 0.09 | | 18 |
| sample 2-5 | | | | 2.6 | 0.07 | | 16 |
| sample 2-6 | | | | 2.6 | 0.05 | | 14 |
| sample 3-1 | 2.5 | 1.0 | 0.5 | 2.5 | 0.25 | 0.5 | 18 |
| sample 3-2 | | | | 2.5 | 0.11 | | 18 |
| sample 3-3 | | | | 2.5 | 0.05 | | 18 |

TABLE 2

| sample No. | raw material compound | production method | heat treatment temperature (° C.) | high frequency power (kW) |
|---|---|---|---|---|
| sample 4-1 | ZrN | heating method in purified gas | 2000 | |
| sample 4-2 | ZrN | heating method under low oxygen partial pressure | 2000 | |
| sample 4-3 | ZrN | thermal plasma method | | 35 |
| sample 4-4 | HfN | heating method under low oxygen partial pressure | 2000 | |
| sample 4-5 | VN | thermal plasma method | | 35 |
| sample 4-6 | NbN | heating method in purified gas | 1800 | |
| sample 4-7 | TaN | heating method under low oxygen partial pressure | 2000 | |
| sample 4-8 | CrN | thermal plasma method | | 35 |
| sample 4-9 | TiCN | heating method in purified gas | 1800 | |
| sample 4-10 | TiCN | heating method under low oxygen partial pressure | 2000 | |
| sample 4-11 | TiCN | thermal plasma method | | 35 |
| sample 5-1 | TiN (C 0.3% added) | heating method under low oxygen partial pressure | 1500 | |
| sample 5-2 | TiN (C 0.3% added) | heating method under low oxygen partial pressure | 1600 | |
| sample 5-3 | TiN (C 0.3% added) | heating method under low oxygen partial pressure | 1700 | |
| sample 5-4 | TiN (C 0.3% added) | heating method under low oxygen partial pressure | 1800 | |
| sample 5-5 | TiN (C 0.3% added) | heating method under low oxygen partial pressure | 1900 | |
| sample 5-6 | TiN (C 0.3% added) | heating method under low oxygen partial pressure | 2000 | |
| sample 5-7 | TiN (C 0.3% added) | thermal plasma method | | 25 |
| sample 5-8 | TiN (C 0.3% added) | thermal plasma method | | 30 |
| sample 5-9 | TiN (C 0.3% added) | thermal plasma method | | 35 |
| sample 6-1 | TiN (C 0.1% added) | heating method under low oxygen partial pressure | 1500 | |
| sample 6-2 | TiN (C 0.1% added) | heating method under low oxygen partial pressure | 1600 | |
| sample 6-3 | TiN (C 0.1% added) | heating method under low oxygen partial pressure | 1700 | |
| sample 6-4 | TiN (C 0.1% added) | heating method under low oxygen partial pressure | 1800 | |
| sample 6-5 | TiN (C 0.1% added) | heating method under low oxygen partial pressure | 1900 | |
| sample 6-6 | TiN (C 0.1% added) | heating method under low oxygen partial pressure | 2000 | |
| sample 6-7 | TiN (C 0.1% added) | thermal plasma method | | 25 |
| sample 6-8 | TiN (C 0.1% added) | thermal plasma method | | 30 |
| sample 6-9 | TiN (C 0.1% added) | thermal plasma method | | 35 |

TABLE 2-continued

| | | pre-treatment | | | post-treatment | | | |
|---|---|---|---|---|---|---|---|---|
| | sample No. | average particle size (μm) | amount of oxygen (wt %) | amount of carbon (wt %) | average particle size (μm) | amount of oxygen (wt %) | amount of carbon (wt %) | proportion of particles less than 1 μm (mass %) |
| | sample 4-1 | 2.7 | 1.5 | 0.5 | 2.8 | 0.06 | 0.5 | |
| | sample 4-2 | 2.7 | 1.5 | | 2.8 | 0.06 | | |
| | sample 4-3 | 2.7 | 1.5 | | 2.7 | 0.06 | | |
| | sample 4-4 | 4.5 | 1.1 | | 4.5 | 0.05 | | |
| | sample 4-5 | 3.0 | 1.3 | | 3.1 | 0.06 | | |
| | sample 4-6 | 3.4 | 1.2 | | 3.4 | 0.10 | | |
| | sample 4-7 | 3.1 | 1.1 | | 3.2 | 0.06 | | |
| | sample 4-8 | 3.8 | 1.1 | | 3.8 | 0.07 | | |
| | sample 4-9 | 2.5 | 1.0 | 9.9 | 2.6 | 0.09 | 9.9 | |
| | sample 4-10 | 2.5 | 1.0 | | 2.6 | 0.09 | | |
| | sample 4-11 | 2.5 | 1.0 | | 2.6 | 0.05 | | |
| | sample 5-1 | 2.5 | 1.0 | 0.3 | 2.5 | 0.29 | 0.3 | 18 |
| | sample 5-2 | | | | 2.5 | 0.22 | | 18 |
| | sample 5-3 | | | | 2.5 | 0.15 | | 18 |
| | sample 5-4 | | | | 2.5 | 0.09 | | 18 |
| | sample 5-5 | | | | 2.6 | 0.07 | | 16 |
| | sample 5-6 | | | | 2.6 | 0.05 | | 14 |
| | sample 5-7 | | | | 2.5 | 0.25 | | 18 |
| | sample 5-8 | | | | 2.5 | 0.11 | | 18 |
| | sample 5-9 | | | | 2.5 | 0.05 | | 18 |
| | sample 6-1 | 2.5 | 1.0 | 0.1 | 2.5 | 0.29 | 0.1 | 18 |
| | sample 6-2 | | | | 2.5 | 0.22 | | 18 |
| | sample 6-3 | | | | 2.5 | 0.15 | | 18 |
| | sample 6-4 | | | | 2.5 | 0.09 | | 18 |
| | sample 6-5 | | | | 2.6 | 0.07 | | 16 |
| | sample 6-6 | | | | 2.6 | 0.05 | | 14 |
| | sample 6-7 | | | | 2.5 | 0.25 | | 18 |
| | sample 6-8 | | | | 2.5 | 0.11 | | 18 |
| | sample 6-9 | | | | 2.5 | 0.05 | | 18 |

TABLE 3

| sample No. | raw material compound | production method | heat treatment temperature (° C.) | high frequency power (kW) |
|---|---|---|---|---|
| sample 7-1 | TiN | heating method in purified gas | 1500 | |
| sample 7-2 | TiN | heating method in purified gas | 1600 | |
| sample 7-3 | TiN | heating method in purified gas | 1700 | |
| sample 7-4 | TiN | heating method in purified gas | 1800 | |
| sample 7-5 | TiN | heating method in purified gas | 1900 | |
| sample 7-6 | TiN | heating method in purified gas | 2000 | |
| sample 8-1 | TiN | heating method under low oxygen partial pressure | 1500 | |
| sample 8-2 | TiN | heating method under low oxygen partial pressure | 1600 | |
| sample 8-3 | TiN | heating method under low oxygen partial pressure | 1700 | |
| sample 8-4 | TiN | heating method under low oxygen partial pressure | 1800 | |
| sample 8-5 | TiN | heating method under low oxygen partial pressure | 1900 | |
| sample 8-6 | TiN | heating method under low oxygen partial pressure | 2000 | |
| sample 9-1 | TiN | thermal plasma method | | 25 |
| sample 9-2 | TiN | thermal plasma method | | 30 |
| sample 9-3 | TiN | thermal plasma method | | 35 |
| comparative sample 1 | TiN | carbon reduction method | 1900 | |

| | | pre-treatment | | | post-treatment | | | |
|---|---|---|---|---|---|---|---|---|
| | sample No. | average particle size (μm) | amount of oxygen (wt %) | amount of carbon (wt %) | average particle size (μm) | amount of oxygen (wt %) | amount of carbon (wt %) | proportion of particles less than 1 μm (mass %) |
| | sample 7-1 | 2.9 | 0.8 | 0.5 | 2.9 | 0.25 | 0.5 | 9 |
| | sample 7-2 | | | | 2.9 | 0.18 | | 8 |
| | sample 7-3 | | | | 2.9 | 0.13 | | 8 |
| | sample 7-4 | | | | 2.9 | 0.08 | | 8 |
| | sample 7-5 | | | | 3.0 | 0.06 | | 7 |
| | sample 7-6 | | | | 3.0 | 0.05 | | 7 |
| | sample 8-1 | 2.9 | 0.8 | 0.5 | 2.9 | 0.24 | 0.5 | 9 |

TABLE 3-continued

| | | | | | | | |
|---|---|---|---|---|---|---|---|
| sample 8-2 | | | | 2.9 | 0.18 | | 8 |
| sample 8-3 | | | | 2.9 | 0.13 | | 8 |
| sample 8-4 | | | | 2.9 | 0.08 | | 8 |
| sample 8-5 | | | | 3.0 | 0.06 | | 7 |
| sample 8-6 | | | | 3.0 | 0.04 | | 7 |
| sample 9-1 | 2.9 | 0.8 | 0.5 | 2.9 | 0.21 | 0.5 | 7 |
| sample 9-2 | | | | 2.9 | 0.09 | | 7 |
| sample 9-3 | | | | 2.9 | 0.04 | | 7 |
| comparative sample 1 | 2.5 | 1.0 | 0.5 | 2.6 | 0.38 | 0.5 | |

As can be seen from Tables 1 to 3, the samples produced in the methods of Examples 1 to 9 were all ceramic powders having particles with an average particle size of 5 μm or less, and an oxygen content of 0.3% by mass or less.

Example 10, Comparative Example 2

A cemented carbide pot and ball was used to mix the ceramic powder of each sample shown in Table 4 and Al powder together at a mass ratio of 80:20. The mixture of the powders was heated in a vacuum at 1200° C. for 30 minutes, and the obtained compound was pulverized to obtain a binder powder. Subsequently, the binder powder and a cubic boron nitride powder having an average particle size of 1.5 μm were mixed at blending ratios shown in Table 4 to obtain composite powders, which were in turn held in a vacuum furnace at 900° C. for 20 minutes and thus degassed. Furthermore, the composite powders were sintered under a pressure of 5 GPa at a temperature of 1300° C. for 20 minutes to obtain samples 10-1 to 10-16 of boron nitride sintered materials of Example 10 and Comparative Sample 2 of Comparative Example 2.

Each sintered material was examined by X-ray diffraction (XRD) (the name of the device: powder x ray diffractometer, manufactured by Rigaku Corporation) for a compound contained therein. Regarding all of the sintered material samples shown in Table 4, a compound inferred to be cubic boron nitride (cBN), TiN or TiCN, TiB$_2$, AlB$_2$ was detected.

Each sintered material was used to produce a tool (ISO model number; SNGA 120408) and the tool was used to cut a workpiece (carburized hardened steel SCM 415, hardness: HRC 60, diameter: 100 mm, length: 300 mm) under the following cutting conditions to investigate the tool's life in fast cutting of hardened steel. Each tool's life was determined when the tool had a flank wear having a width of 0.2 mm or more. The result is shown in table 4.

Cutting speed V=200 m/min
Feed rate f=0.1 mm/rev.
Depth of cut d=0.2 mm
Dry cutting.

TABLE 4

| sample No. | sample No. of ceramic powder used as binder | blending ratio cubic boron nitride:binder | tool life (min.) |
|---|---|---|---|
| sample 10-1 | sample 1-1 | 60:40 | 23 |
| sample 10-2 | sample 1-2 | 60:40 | 25 |
| sample 10-3 | sample 1-4 | 60:40 | 28 |
| sample 10-4 | sample 1-6 | 60:40 | 32 |
| sample 10-5 | sample 2-6 | 60:40 | 32 |
| sample 10-6 | sample 3-3 | 60:40 | 33 |
| sample 10-7 | sample 7-6 | 65:35 | 29 |
| sample 10-8 | sample 8-6 | 55:45 | 33 |
| sample 10-9 | sample 9-3 | 50:50 | 35 |
| sample 10-10 | sample 7-6 | 60:40 | 33 |
| sample 10-11 | sample 4-10 | 60:40 | 26 |
| sample 10-12 | sample 4-11 | 60:40 | 31 |
| sample 10-13 | sample 5-6 | 60:40 | 34 |
| sample 10-14 | sample 5-9 | 60:40 | 35 |
| sample 10-15 | sample 6-6 | 60:40 | 36 |
| sample 10-16 | sample 6-9 | 60:40 | 37 |
| comparative sample 2 | comparative sample 1 | 60:40 | 16 |

As can be seen from Table 4, the tools produced using the sintered materials produced in Example 10 (samples 10-1 to 10-16) had longer lives than the tool produced using the sintered material of Comparative Sample 2. That is, it has been found that the sintered materials produced in Example 10 are superior in strength to the sintered material produced in Comparative Example 2. Furthermore, sample 10-10 had a longer life than samples 10-1 to 10-6 having the same blending ratio of cubic boron nitride and the binder as sample 10-10, and it has been found that a sintered material using the titanium nitride powder of Sample 7-6 in which the proportion of particles of less than 1 μm is 10% by mass is higher in strength. Furthermore, sample 10-7 had a life of the same extent as those of samples 10-1 to 10-6 having the binder blended in a larger amount, and it has been found that using titanium nitride powder in which the proportion of particles of less than 1 μm is 10% by mass as a binder allows a desired strength to be obtained with a smaller amount of the binder. Furthermore, by comparing samples 10-11 to 10-16, it has been found that a sintered material has larger strength as the ceramic powder used as the binder has a smaller carbon content.

Example 11

The ceramic powder of each sample shown in Table 5 was used to produce tools of Samples 11-1 to 11-9 in a manner similar to that in Example 10. Subsequently, in order to clarify the effect of the content of carbon in the ceramic powder, a cutting test was conducted in which high-speed heavy interrupted cutting was conducted under the following conditions, and each tool's life until the tool had a fracture of 0.1 mm or more (i.e., an interrupted cutting life) was thus obtained. The result is shown in table 5.

Workpiece: Carburized hardened steel SCN415H, HRC62 (100 mm in diameter×300 mm in length, with 5 V grooves in the axial direction of the workpiece)
Cutting speed V=150 m/min.
Feed rate f=0.12 mm/rev.
Depth of cut d=0.5 mm
Dry cutting.

TABLE 5

| sample No. | sample No. of ceramic powder used as binder | blending ratio cubic boron nitride:binder | tool life (min.) |
| --- | --- | --- | --- |
| sample 11-1 | 2-1 | 60:40 | 15 |
| sample 11-2 | 2-6 | 60:40 | 17 |
| sample 11-3 | 3-3 | 60:40 | 18 |
| sample 11-4 | 5-1 | 60:40 | 33 |
| sample 11-5 | 5-6 | 60:40 | 35 |
| sample 11-6 | 5-9 | 60:40 | 37 |
| sample 11-7 | 6-1 | 60:40 | 36 |
| sample 11-8 | 6-6 | 60:40 | 39 |
| sample 11-9 | 6-9 | 60:40 | 40 |

As can be seen from Table 5, in the high-speed heavy interrupted cutting, samples 11-4 to 11-9 each having a small amount of carbon in the ceramic powder had a long life. Samples 11-4 to 11-9, produced in the second and third production methods, contain oxygen and carbon both in small amounts, respectively, and it is inferred that they exhibited a remarkable effect in high-speed interrupted cutting requiring a tool to be strong.

Comparative Example 3

The titanium nitride powders produced in Examples 2 and 3 (Sample 2-6 and Sample 3-3) were subjected to a heat treatment in an electric furnace in the atmospheric air at 600° C. for 1 hour. After the treatment, each powder's average particle size, oxygen content and carbon content before and after the reduction treatment were measured in a method similar to the above described measurement method. The measurement result is shown in table 6.

TABLE 6

| | | | pre-treatment | | | post-treatment | | |
| --- | --- | --- | --- | --- | --- | --- | --- | --- |
| sample No. | sample No. of titanium nitride powder used | heat treatment temperature (° C.) | average particle size (μm) | amount of oxygen (wt %) | amount of carbon (wt %) | average particle size (μm) | amount of oxygen (wt %) | amount of carbon (wt %) |
| comparative sample 3 | sample 2-6 | 600 | 2.6 | 0.05 | 0.5 | 2.6 | 5 | 0.1 |
| comparative sample 4 | sample 3-3 | 600 | 2.5 | 0.05 | 0.5 | 2.5 | 6 | 0.1 |

By the heat treatment in the atmospheric air, while the amount of carbon was decreased, the amount of oxygen was increased. In contrast, as shown in Table 2, Samples 5-1 to 5-9 and Samples 6-1 to 6-9 have an amount of oxygen and an amount of carbon both achieving 0.3% by mass or less. This indicates that the first to third production methods are excellent methods capable of reducing the amount of oxygen without increasing the amount of carbon of the raw material.

It should be understood that the embodiments disclosed herein have been described for the purpose of illustration only and in a non-restrictive manner in any respect. The scope of the present invention is defined by the terms of the claims, rather than the embodiments description above, and is intended to include any modifications within the meaning and scope equivalent to the terms of the claims.

INDUSTRIAL APPLICABILITY

The nitride powder of the present invention is usefully used as a raw material for a hard material for cutting tools, anti-abrasive parts and the like.

The invention claimed is:
1. A method for producing a ceramic powder, comprising:
   heating in a purified gas, heating under low oxygen partial pressure, or treating by thermal plasma a raw ceramic powder, wherein
   the raw ceramic powder contains at least one of a nitride and a carbonitride of one or more elements selected from the group consisting of a group 4 element, a group 5 element and a group 6 element,
   the ceramic powder contains at least one of a nitride and a carbonitride of a metal element,
   the metal element is one or more elements selected from the group consisting of a group 4 element, a group 5 element and a group 6 element, and
   the ceramic powder has an average particle size of 5 μm or less and an oxygen content of 0.1% by mass or less.
2. The method for producing a ceramic powder according to claim 1, wherein
   the raw ceramic powder contains the nitride of one or more elements selected from the group consisting of the group 4 element, the group 5 element and the group 6 element,
   the ceramic powder contains the nitride of the metal element, and
   the ceramic powder has a carbon content of 0.3% by mass or less.
3. The method for producing a ceramic powder according to claim 2, wherein the carbon content is 0.1% by mass or less.
4. The method for producing a ceramic powder according to claim 1, wherein the metal element is titanium.

5. The method for producing a ceramic powder according to claim 1, wherein the ceramic powder has a proportion of particles having a particle size of 1 μm or less being less than 10% by mass.

6. A method for producing a boron nitride sintered material, comprising:
  producing a ceramic powder by a method as recited in claim 4; and
  sintering a composite powder including cubic boron nitride and the ceramic powder.

* * * * *